3,651,032
VULCANIZABLE ETHYLENE/PROPYLENE CO-
  POLYMERS AND PROCESS FOR PREPARING
  SAME
Nazzareno Cameli, Paolo Longi, Alberto Valvassori, and
  Sandro Parodi, Milan, Italy, assignors to The B. F.
  Goodrich Company, Akron, Ohio
  No Drawing. Filed June 10, 1970, Ser. No. 45,256
  Claims priority, application Italy, June 11, 1969,
              18,049/69
          Int. Cl. C08f 17/00
U.S. Cl. 260—79.5 B                         11 Claims

ABSTRACT OF THE DISCLOSURE

Vulcanizable copolymers of ethylene, propylene, dicyclopentadiene and hexadiene-1,4 are disclosed, as well as a process for preparing them. The copolymers have the same characteristics of vulcanizability and fast vulcanization rate as do copolymers of ethylene, propylene and hexadiene-1,4, but are less costly.

THE PRIOR ART

Italian Pat. No. 638,953 discloses the preparation of ethylene/propylene/hexadiene-1,4 copolymers using catalysts soluble or highly dispersible in the liquid medium in which the copolymerization is carried out. The terpolymers obtained, even at low unsaturation content (1.5–2% by weight) are easily vulcanizable by conventional methods, and at particularly fast vulcanization rates.

THE PRESENT INVENTION

One object of this invention was to provide copolymers which are readily vulcanizable at fast rates by the conventional methods to commercially useful elastomers, but which are less costly than the ethylene/propylene/hexadiene-1,4 terpolymers.

This and other objects are accomplished by the present invention in accordance wiith which, instead of using hexadiene-1,4 only as the termonomer, there is used a mixture of hexadiene and dicyclopentadiene in a ratio comprised between 10:1 and 1:10, preferably between 5:1 and 1:5.

By substituting dicyclopentadiene for a portion of the hexadiene-1,4 used in preparing the prior art terpolymers, we obtain unexpectedly, copolymers which have the advantages of the vulcanizable ethylene/propylene/hexadiene copolymers, but at a lower cost due to the comparatively low cost of the readily available dicyclopentadiene, and thus provide distinctly new and valuable modified ethylene / propylene / hexadiene copolymers containing units of dicyclopentadiene at a decided economic advantage.

The new copolymers are obtained by copolymerizing a mixture of the four monomers in the liquid phase and contact with a catalyst soluble or highly dispersible in the liquid polymerization medium and obtained by mixing (a) a hydride or organometallic compound of beryllium, aluminum or a lithium-aluminum complex with (b) a hydrocarbon-soluble vanadium compound.

Catalyst-forming component (a) may be selected from beryllium dialkyls, aluminum trialkyls, lithium-aluminum tetraalkyls, alkyl beryllium chlorides, alkyl aluminum (mono-, di- or sesqui-) chlorides, phenyl aluminum bromides, lithium-aluminum monofluoroalkyls, phenyl beryllium iodide, etc.

The hydrocarbon-soluble vanadium compound mixed with component (a) to obtain the catalyst may be selected from the vanadium halides and oxyhalides, vanadium and vanadyl alcoholates, vanadium and vanadyl acetylacetonates, vanadium and vanadyl halogenalcoholates and halogenacetylacetonates, complexes of vanadium halides and oxyhalides with Lewis bases etc.

The preferred catalysts are those in which at least one of catalyst-forming component (a) and (b) contains halogen.

The copolymerization according to the invention is carried out at a temperature of from −80° C. to +125° C. Preferably the copolymerization is carried out at a temperature of from −30° C. to +30° C., in which temperature range the catalysts are most active and stable.

As indicated above, the copolymerization is conducted in the liquid phase. It may be carried out in the presence or absence of a solvent for the copolymer which is formed. Useful solvents are, for instance, aliphatic hydrocarbons, aromatic hydrocarbons, and cycloaliphatic hydrocarbons. Chlorinated hydrocarbon solvents which are inert to the catalysts may also be used. These include chlorobenzene, tetrachlorethylene, methyl chloride, etc.

When the copolymerization is performed in the absence of an extraneous solvent, the liquid polymerization medium consists prevailingly of a liquified mixture of ethylene and propylene in which the copolymer formed is insoluble, i.e., the copolymerization is carried out in suspension.

In order to obtain copolymers of homogeneous composition, it is necessary to maintain the ratios between the concentrations of the four monomers constant, or as constant as possible, during the copolymerization reaction.

By varying said ratios, the composition of the copolymers produced can be varied over a wide range.

For the production of amorphous copolymers containing less than 85% by moles of ethylene, the molar ratio of propylene to ethylene maintained in the reacting liquid phase should be at least 4:1 and in the range 200:1 to 4:1.

When the ethylene/propylene molar ratio is higher than 1:4, the copolymers obtained generally exhibit crystallinity of the polyethylenic type.

Preferably, the copolymers contain from 50% to 15% in moles of propylene, and have a total dienes content of from 0.1% to 20% in moles.

The preferred molar ratio of hexadiene-1,4 to dicyclopentadiene in the copolymers is from 5:1 to 1:5. However, the copolymers in which said molar ratio is from 10:1 to 1:10 also have good vulcanizability characteristics.

The copolymers of the invention are linear, that is, the copolymers lack long branchings, as proved by the fact that the properties thereof, particularly the viscous behavior, are practically the same as those of the elastomeric ethylene/propylene copolymers disclosed earlier by Natta et al.

The molecular weight of these copolymers is generally higher than 20,000 as shown by the intrinsic viscosities which, determined in tetrahydronaphthalene at 135° C., or in toluene at 30° C., are higher than 0.5 dl./g.

The molecular weight of the copolymers may be regulated, during production thereof, by including molecular weight regulators, such as hydrogen or zinc alkyls, in the polymerization zone.

When the copolymer obtained has an unsaturation content higher than 0.4% in moles, it can be vulcanized very readily by the conventional methods, such as the methods utilizing sulphur, accelerators and carbon black vulcanizing aids. The vulcanization rates of the copolymers according to the invention are set forth in the examples given below, from which the excellent physical-mechanical properties of the copolymers will be apparent. Because of the properties possessed thereby, the present copolymers can be used for all purposes for which natural and other synthetic rubbers are used. The vulcanizates of the present copolymers can be used advantageously as substitutes for natural rubber and the known synthetic rubbers.

The following examples are given to illustrate the invention and are not intended to be limiting.

EXAMPLE 1

The reaction vessel consisted of a glass cylinder of 10 cm. diameter and 4000 cc. capacity, and provided with a stirrer, a thermometer, and pipes for the inflow and outflow of the gases. The gas inlet pipe extended to the bottom of the reaction vessel and terminated in a porous section.

Into this vessel kept at a temperature of $-20°$ C. by immersion in a thermostatic bath, were introduced: 3000 cc. of n-heptane, 2 cc. of dicyclopentadiene, 8 cc. of 1,4-hexadiene trans and 0.25 millimole of zinc diethyl. Through the gas inlet pipe was then introduced a propylene-ethylene mixture in a molar ratio equal to 3:1, which was circulated at a rate of 1200 Nl./hr. After 30 minutes of saturation, there were introduced into the reactor 3.6 millimoles of aluminum diethylchloride and 0.06 millimole of vanadium triacetylacetonate dissolved in 20 cc. of toluene. During the run, the mixture was continuously fed and discharged from the reactor at a rate of 1200 Nl./hr.

After 30 minutes from the introduction of the catalyst into the reactor, the reaction was stopped by adding 10 cc. of methanol.

The product, purified in a separator funnel by means of repeated washing with diluted hydrochloric acid and subsequently with water, was finally coagulated with an acetone-methanol mixture.

After drying under vacuum, there were obtained 27 g. of a solid product which was amorphous on X-ray examination and looked like an unvulcanized elastomer. It was completely soluble in boiling n-heptane. On examination by infrared spectrography, the product was found to contain 42% by weight of propylene, 0.2% by weight of hexadiene and 2.4% by weight of dicyclopentadiene. The balance (55.4%) was ethylene. The Mooney viscosity (ML-4 at 100° C.) amounted to 131.

100 parts by weight of this copolymer were then mixed with 80 parts of ISAF carbon black, 55 parts of Flexon Oil 766, 1 part of stearic acid, 5 parts by weight of zinc oxide, 0.75 part of mercaptobenzothiazol, 1.5 parts of tetramethylthiuram-monosulphide and 1.5 parts of sulphur.

The mix was vulcanized in a press at 150° C. for different times. The properties of the vulcanized products are recorded in the following Table I.

TABLE I

| Time, min | 15 | 30 | 60 | 90 | 120 | 180 | 240 |
|---|---|---|---|---|---|---|---|
| Breaking load, kg./cm.$^2$ | 202 | 236 | 222 | 235 | 222 | 223 | 227 |
| Elongation at break, percent | 900 | 710 | 540 | 530 | 500 | 480 | 500 |
| Elastic modulus at 200%, kg./cm.$^2$ | 17 | 28 | 38 | 49 | 50 | 50 | 44 |
| Elastic modulus at 300%, kg./cm.$^2$ | 32 | 62 | 81 | 100 | 100 | 102 | 100 |
| Permanent set, percent | 50 | 28 | 14 | 14 | 12 | 10 | 10 |

As clearly appears from these data, the maximum degree of crosslinking (deducible from the values of the modulus) is attained after about 90 minutes.

EXAMPLE 2

Example 1 was repeated, but with the following variations:

1,4-hexadiene trans—12 cc.
Vanadium triacetylacetonate—0.1 mmol
Al(C$_2$H$_5$)$_2$Cl—0.15 mmol Thereby were obtained 57 g. of a polymer showing the following composition:

Propylene content—42% by weight
Hexadiene content—0.6% by weight
Dicyclopentadiene content—2.3% by weight
Mooney viscosity—153

The polymer was vulcanized with the same mix and under the same conditions as described in Example 1. The properties of the vulcanized products are given in Table II.

TABLE II

| Time, min | 15 | 30 | 60 | 90 | 120 | 180 | 240 |
|---|---|---|---|---|---|---|---|
| Breaking load, kg./cm.$^2$ | 224 | 239 | 227 | 226 | 216 | 213 | 222 |
| Elongation at break, percent | 890 | 680 | 540 | 500 | 460 | 460 | 460 |
| Elastic modulus at 200%, kg./cm.$^2$ | 20 | 30 | 45 | 52 | 53 | 53 | 54 |
| Elastic modulus at 300%, kg./cm.$^2$ | 33 | 60 | 86 | 103 | 107 | 108 | 107 |
| Permanent set, percent | 48 | 24 | 16 | 12 | 12 | 10 | 12 |

As appears from the given data in Table II, the vulcanization rate is similar to that of the copolymer described in Example 1.

EXAMPLE 3

Into the reaction vessel described in Example 1, thermostabilized at 20° C. there were introduced 3000 cc. of n-heptane, 2 cc. of dicyclopentadiene, 8 cc. of 1,4-hexadiene trans and 0.3 millimole of diethyl zinc.

Through the gas inflow pipe was then introduced a mixture of propylene/ethylene in a molar ratio of 3:1, which was circulated in the reactor at a rate of 1200 Nl./hr. After 30 minutes of saturation, there were introduced into the reactor 7.5 mm. of diethyl aluminum chloride and 0.25 mm. of vanalyl diacetylacetonate dissolved in 20 cc. of toluene.

The polymerization was stopped after 30 minutes by adding 10 cc. of methanol. After the removal of the catalytic residues by treatment with diluted hydrochloric acid, the polymer was coagulated with a methanol acetone mixture. Thereby were obtained 50 g. of a product showing the following composition:

Propylene content—43% by weight
Hexadiene content—0.4% by weight
Dicyclopentadiene content—2.1% by weight
Mooney viscosity (ML-4 at 100° C.)—85

The copolymer was vulcanized with the same mix and under the same conditions as described in Example 1. The properties of the vulcanized products are shown in Table III.

TABLE III

| Time, min | 15 | 30 | 60 | 90 | 120 | 180 | 240 |
|---|---|---|---|---|---|---|---|
| Breaking load, kg./cm.$^2$ | 168 | 215 | 222 | 233 | 228 | 213 | 219 |
| Elongation at break, percent | 940 | 740 | 610 | 560 | 500 | 490 | 510 |
| Elastic modulus at 200%, kg./cm.$^2$ | 14 | 24 | 36 | 49 | 49 | 48 | 44 |
| Elastic modulus at 300%, kg./cm.$^2$ | 22 | 49 | 77 | 98 | 98 | 101 | 93 |
| Permanent set, percent | 64 | 30 | 24 | 20 | 14 | 14 | 16 |

As clearly appears from these data, the vulcanization rate is similar to that of the copolymer described in Example 1.

EXAMPLE 4

In this run, Example 3 was repeated except that, 12 cc. of 1,4-hexadiene trans and 0.25 mm. of zinc diethyl were used. The copolymer (58 g.) obtained had the following composition:

Propylene content—43% by weight
Hexadiene content—0.85% by weight
Dicyclopentadiene content—2% by weight
Mooney viscosity—139

The copolymer was vulcanized with the same mixture and under the same conditions as those described in Example 1. The properties of the vulcanized products are reported in Table IV.

TABLE IV

| Time, min | 15 | 30 | 60 | 90 | 120 | 180 | 240 |
|---|---|---|---|---|---|---|---|
| Breaking load, kg./cm.$^2$ | 215 | 253 | 243 | 228 | 231 | 226 | 212 |
| Elongation at break, percent | 880 | 680 | 570 | 480 | 480 | 480 | 440 |
| Elastic modulus at 200%, kg./cm.$^2$ | 16 | 31 | 40 | 57 | 63 | 50 | 53 |
| Elastic modulus at 300%, kg./cm.$^2$ | 33 | 66 | 86 | 114 | 122 | 110 | 115 |
| Permanent set, percent | 48 | 28 | 16 | 12 | 12 | 10 | 10 |

As appears quite clearly from the above data, the vulcanization rate is similar to that of the copolymer described in Example 1.

EXAMPLE 5

Example 4 was repeated, using, however, instead of 12 cc. of 1,4-hexadiene trans, 26 cc. of 1,4-hexadiene cis.

There were obtained 52 g. of a product showing a composition similar to that of the copolymer described in Example 4. The Mooney viscosity amounted to 98. The properties of the vulcanized product and the vulcanization rate are comparable with those of the copolymers described in Examples 1 to 4.

EXAMPLE 6

An ethylene-propylene-dicyclopentadiene copolymer, containing, by weight 32% of propylene and 3.9% of dicyclopentadiene, and having a Mooney viscosity of 163, was vulcanized with the same mixture and under the same conditions as those described in Example 1.

The properties of the vulcanized product are recorded in Table V.

TABLE V

| Time, min. | 30 | 60 | 90 | 120 | 180 | 240 |
|---|---|---|---|---|---|---|
| Breaking load, kg./cm.² | 245 | 207 | 199 | 182 | 192 | 195 |
| Elongation at break, percent | 640 | 480 | 430 | 400 | 400 | 390 |
| Elastic modulus at 200%, kg./cm.² | 35 | 52 | 59 | 65 | 69 | 65 |
| Elastic modulus at 300%, kg./cm.² | 69 | 101 | 118 | 124 | 133 | 135 |
| Permanent set, percent | 28 | 16 | 12 | 12 | 8 | 8 |

As clearly appears from the above reported data, the vulcanization rate for the ethylene-propylene/dicyclopentadiene copolymer is lower than that of the copolymers of ethylene-propylene-hexadiene-dicyclopentadiene described in Examples 1 to 4 inclusive.

After 90 minutes, the value of the elastic modulus at 300% of elongation was only 85% of the value measured after 240 minutes.

Changes may be made in practicing this invention without departing from its spirit. Therefore, we intend to include, in the scope of the appended claims all modifications and variations which will be apparent to those skilled in the art from the description and working examples given herein.

What is claimed is:

1. Unsaturated, sulphur-vulcanizable, high molecular weight amorphous copolymers of ethylene, propylene, dicyclopentadiene and 1,4-hexadiene having an intrinsic viscosity greater than 0.5 dl./g., determined in tetrahydronaphthalene at 135° C., containing less than 85 mol percent ethylene, from 15 to 50 mol percent propylene and from 0.1 to 20 mol percent dicyclopentadiene and 1,4-hexadiene in ratios between 1:10 and 10:1.

2. Copolymers according to claim 1, characterized in containing at least 0.4% in moles of unsaturations.

3. Copolymers according to claim 2, characterized in containing hexadienic -1,4 and dicyclopentadienic units in ratios comprised between 1:5 and 5:1.

4. Copolymers according to claim 1, characterized in being amorphous on X-ray examination.

5. Copolymers according to claim 1, characterized in that trans 1,4-hexadiene is used as one comonomer.

6. Copolymers according to claim 1, characterized in that cis 1,4-hexadiene is used as one comonomer.

7. Vulcanizable compositions characterized in comprising copolymers according to claim 1.

8. Vulcanizable compositions comprising copolymers according to claim 7, sulphur or sulphur donating compounds as crosslinking agents, vulcanization accelerators and reinforcing fillers.

9. Vulcanizable compositions according to claim 8, characterized in that the reinforcing filler is carbon black.

10. Elastomers which are sulphur-vulcanized copolymers according to claim 1.

11. Vulcanized elastomers characterized in being obtained by vulcanization of the vulcanizable compositions according to claim 10.

References Cited

UNITED STATES PATENTS

| 3,166,517 | 1/1965 | Ro | 252—429 |
| 3,340,240 | 9/1967 | Natta | 260—88.2 |
| 3,444,146 | 5/1969 | Valvassori | 260—79.5 |
| 3,470,142 | 9/1969 | Sartori | 260—79.5 |
| 3,554,988 | 1/1971 | Emde | 260—79.5 |

JOSEPH L. SCHOFER, Primary Examiner

R. S. BENJAMIN, Assistant Examiner

U.S. Cl. X.R.

260—41 R, 80.78